US009614312B2

(12) United States Patent
Wang et al.

(10) Patent No.: US 9,614,312 B2
(45) Date of Patent: *Apr. 4, 2017

(54) TERMINAL AND ELECTRICAL CONNECTOR

(71) Applicant: Molex, LLC, Lisle, IL (US)

(72) Inventors: Hong-Liang Wang, Chengdu (CN); Shang-Xiu Zeng, Chengdu (CN); Kian-Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,228

(22) Filed: Oct. 18, 2016

(65) Prior Publication Data

US 2017/0040729 A1    Feb. 9, 2017

Related U.S. Application Data

(63) Continuation of application No. 14/812,352, filed on Jul. 29, 2015, now Pat. No. 9,502,803.

(30) Foreign Application Priority Data

Jul. 29, 2014   (CN) .......................... 2014 1 0364926

(51) Int. Cl.
| | | |
|---|---|---|
| *H01R 13/24* | (2006.01) | |
| *H01R 12/57* | (2011.01) | |
| *H01R 12/71* | (2011.01) | |

(52) U.S. Cl.
CPC ......... *H01R 13/2478* (2013.01); *H01R 12/57* (2013.01); *H01R 12/714* (2013.01); *H01R 13/2442* (2013.01)

(58) Field of Classification Search
CPC   H01R 13/02; H01R 12/7076; H01R 13/2478; H01R 12/57; H01R 12/714; H01R 13/2442
USPC ..... 439/630, 752, 345, 635, 862, 632, 733.1
See application file for complete search history.

(56) References Cited

U.S. PATENT DOCUMENTS

| | | | | |
|---|---|---|---|---|
| 6,113,440 | A * | 9/2000 | Fijten ................. | H01R 13/2442 439/862 |
| 6,454,607 | B2 * | 9/2002 | Bricaud ............. | H01R 13/2442 439/180 |
| 6,843,688 | B2 | 1/2005 | Matsunaga et al. | |
| 7,775,826 | B1 * | 8/2010 | Wang ................. | H01R 13/6335 439/489 |

(Continued)

FOREIGN PATENT DOCUMENTS

| | | |
|---|---|---|
| CN | 203242821 U | 10/2013 |
| CN | 203326222 U | 12/2013 |

*Primary Examiner* — Edwin A. Leon
(74) *Attorney, Agent, or Firm* — James A. O'Malley

(57) ABSTRACT

A terminal and an electrical connector are provided. The terminal has a tail, an elastic arm, a contact and a front guiding member. The elastic arm is connected to the tail. The contact is positioned at a distal end of the elastic arm. The contact has a front guiding surface extending forwards and downwards. The front guiding member extends forwards from the elastic arm. The front guiding member has a front guiding portion that extends forwards and downwards. An extending direction of the elastic arm and an extending direction of the front guiding member intersected at an angle. The front guiding portion is positioned in front of the front guiding surface of the contact.

14 Claims, 11 Drawing Sheets

(56) References Cited

U.S. PATENT DOCUMENTS

| | | | |
|---|---|---|---|
| 7,798,859 B1* | 9/2010 | Yang | H01R 13/2442 |
| | | | 439/630 |
| 8,564,965 B2 | 10/2013 | Sloey et al. | |
| 2009/0023319 A1 | 1/2009 | Hou | |
| 2010/0055985 A1 | 3/2010 | Hu | |
| 2011/0269328 A1 | 11/2011 | Huo | |
| 2013/0005166 A1 | 1/2013 | Lim | |
| 2014/0113495 A1 | 4/2014 | Lim | |
| 2014/0148036 A1 | 5/2014 | Tan et al. | |

* cited by examiner

TERMINAL AND ELECTRICAL CONNECTOR

RELATED APPLICATIONS

This application is a continuation of U.S. patent application Ser. No. 14/812,352,filed Jul. 29, 2015, which issued as U.S. Pat. No. 9,502,803 on Nov. 22, 2016, which, in turn, claims priority to Chinese Application No. 201410364926.9, filed Jul. 29, 2014, which is incorporated herein by reference in its entirety.

TECHNICAL FIELD

The present disclosure relates to a terminal and an electrical connector.

BACKGROUND ART

An electrical connector typically has a plurality of terminals. Generally, a terminal obliquely extends into an insertion space. When an insertion device is inserted into the insertion space along the insertion direction, the insertion device will exert a horizontal component force and a vertical component force on the terminal. The vertical component force will make the terminal move toward the outside of the insertion space, so that the insertion device may be inserted into the insertion space. Under some situations, the horizontal component force may make the terminal deformed, so a contact of the terminal for electrically connecting the insertion device may be offset from a normal position of the contact.

To avoid the above situations, U.S. Pat. No. 6,843,688 discloses a design of a terminal. The terminal comprises an insulative body, a contact and extension portions. The terminal is provided to the insulative body, the extension portions extend from both sides of the contact toward the insulative body in form of an arc surface or an oblique surface. The contact typically forms a highest position of the terminal, therefore the extension portion extending from the highest position extends steeply and downwards, especially when the position of the contact is higher. When the insertion device is inserted, the insertion device easily exerts a larger horizontal component force on the extension portion which extends steeply, the terminal is easily subjected to a larger impact force and a lateral shearing force and in turn the terminal is easily deformed.

SUMMARY OF THE INVENTION

A terminal is disclosed and includes a tail, an elastic arm, a contact and a front guiding member. The elastic arm is connected to the tail. The contact is positioned at a distal end of the elastic arm. The contact comprises a front guiding surface that extends forwards and downwards. The front guiding member extends forwards from the elastic arm. An extending direction of the elastic arm and an extending direction of the front guiding member are intersected as an angle. The front guiding portion is positioned in front of the front guiding surface of the contact. A highest position of the front guiding member is lower than a highest position of the contact. A lowest position of the front guiding surface of the contact is lower than the highest position of the front guiding member.

In an embodiment, the terminal further comprises a rear guiding member extending rearwards from the elastic arm, the rear guiding member comprises a rear guiding portion extending rearwards and downwards, the contact comprises a rear guiding surface extending rearwards and downwards, the rear guiding portion is positioned behind the rear guiding surface, a highest position of the rear guiding member is lower than the highest position of the contact, a lowest position of the rear guiding surface is lower than the highest position of the rear guiding member.

In an embodiment, the rear guiding member comprises: a connecting portion extending rearwards from the elastic arm; and a protruding portion protruding upwards and is connected to the rear guiding portion. In an embodiment, the contact is an arch top cover, a front surface of the arch top cover forms the front guiding surface, and a rear surface of the arch top cover forms the rear guiding surface.

In an embodiment, the extending direction of the elastic arm and an extending direction of the rear guiding member are intersected as an angle of 90°. In another embodiment, the extending direction of the elastic arm and the extending direction of the front guiding member are intersected as the angle of 90°.

In an embodiment, the front guiding member comprises: a connecting portion extending forwards from the elastic arm; and a protruding portion protruding upwards and connected to the front guiding portion.

An electrical connector includes an insulative housing with an upper surface; and a plurality of terminals fixed to the insulative housing. The plurality of terminals each includes a tail; an elastic arm connected to the tail; a contact positioned at a distal end of the elastic arm and protruding relative to the upper surface of the insulative housing, the contact comprising a front guiding surface extending forwards and downwards; and a front guiding member extending forwards from the elastic arm. The front guiding member comprises a front guiding portion extending forwards and downwards, the front guiding portion protrudes relative to the upper surface of the insulative housing, an extending direction of the elastic arm and an extending direction of the front guiding member are intersected as an angle, the front guiding portion is positioned in front of the front guiding surface of the contact, a highest position of the front guiding member is lower than a highest position of the contact, a lowest position of the front guiding surface of the contact is lower than the highest position of the front guiding member, a lowest position of the front guiding member is lower than the upper surface of the insulative housing.

BRIEF DESCRIPTION OF THE DRAWINGS

FIG. 3 is a schematic view of an embodiment of the present disclosure illustrating terminals, a frame and the like.

DETAILED DESCRIPTION OF THE PREFERRED EMBODIMENTS

As can be appreciated, a number of embodiments of disclosed. Potential benefits of the present disclosure include that the front guiding member may be contacted and pressed downwards first to make the contact of the terminal move downwards by a certain distance when the electronic card is inserted, then the electronic card contacts and downwards presses the contact; that is the contact of the terminal may be pressed downwards in two stages, which may significantly decrease the impact force and the lateral shearing force exerted on the terminal, and help maintain the normal function of the terminal.

Figure 1:
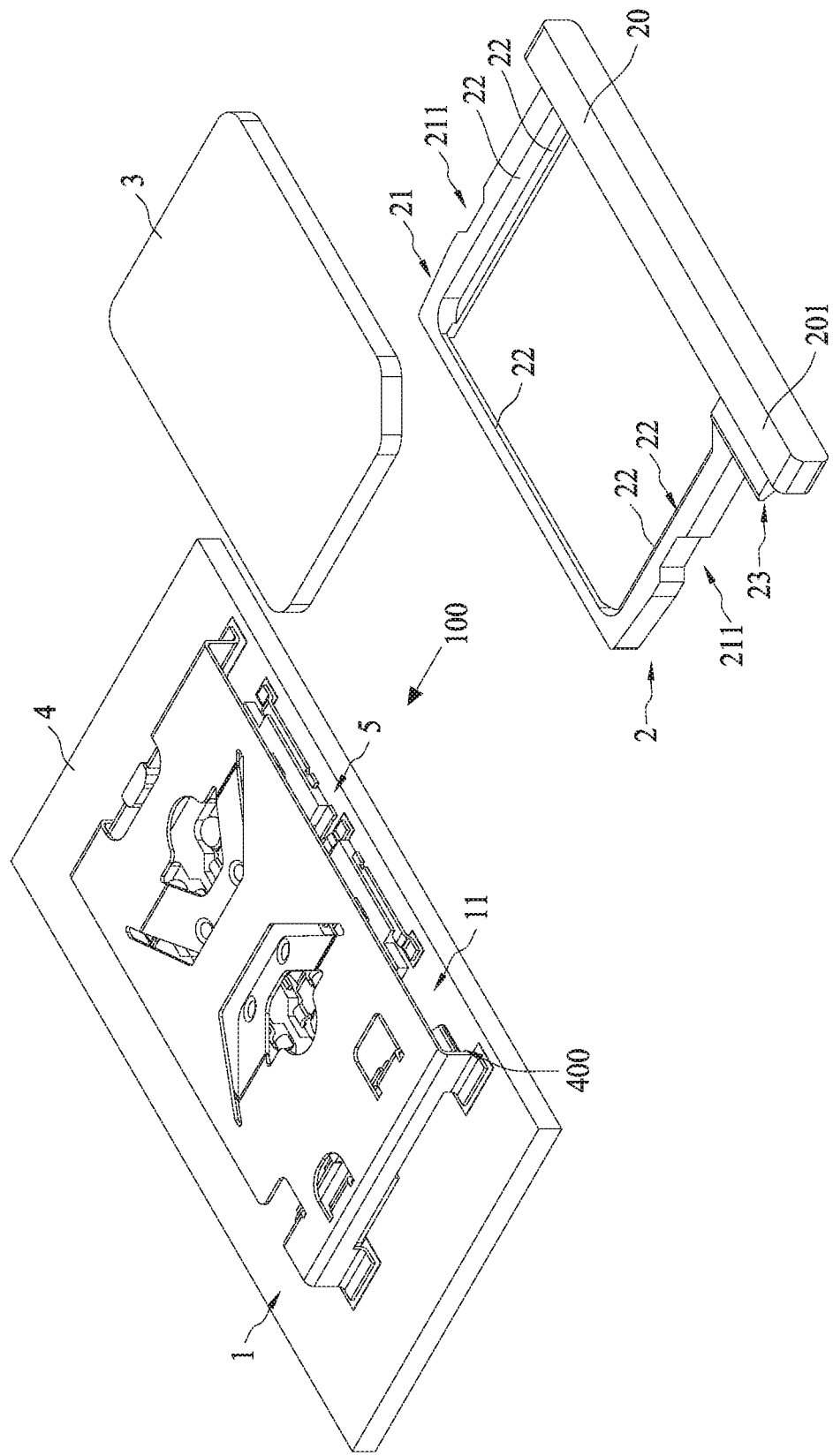
FIG. 1 is a schematic view of an embodiment of the present disclosure illustrating an electrical connector, a tray, an electronic card and a circuit board.

Referring to FIG. 1, an electrical connector 1 may be provided on a circuit board 4. The electrical connector 1 may be used for insertion of a tray 2 carrying an electronic card 3 or insertion of an electronic card 3. The electrical connector 1 defines an insertion space 11. The tray 2 carrying an electronic card 3 or the electronic card 3 may be inserted into the insertion space 11, thereby making the electronic card 3 electrically connected to the circuit board 4 via the electrical connector 1. The electrical connector 1 has an opening 400, the opening 400 is positioned at a front end of the insertion space 11. The tray 2 carrying an electronic card 3 or the electronic card 3 may be inserted into the insertion space 11 along a card insertion direction 100 which is from the front to the rear via the opening 400.

Referring to FIGS. 1-4, the electrical connector 1 comprises a terminal module 5. The terminal module 5 comprises an insulative housing 51 and a plurality of terminals 52. The plurality of terminals 52 are fixed to the insulative housing 51. In some embodiments, the plurality of terminals 52 are embedded in the insulative housing 51; but the present disclosure is not limited to this.

Referring to FIGS. 1, 3 and 5-7, the terminal 52 comprises a tail 521, an elastic arm 522, a contact 523 and a front guiding member 524. The elastic arm 522 may make the contact 523 displace elastically. The contact 523 may contact a connecting pad on the electronic card 3. The front guiding member 524 may first contact the electronic card 3 before the inserted electronic card 3 contacts the elastic arm 522 or the contact 523, and in turn bring the elastic arm 522 and the contact 523 to lower in height, thereby decreasing impact force and lateral shearing force on the elastic arm 522 and the contact 523 from the inserted electronic card 3.

The tail 521 of the terminal 52 may be soldered on the circuit board 4. The tail 521 of the terminal 52 may be connected to an end of the elastic arm 522. In some embodiments, the terminal 52 comprises an extension portion 525, the tail 521 is connected to the extension portion 525. The tail 521 may make the tail 521 extend to a predetermined position via the extension portion 525. In some embodiments, the terminal 52 comprises a base portion 526. The tail 521 may be connected to the base portion 526, and the elastic arm 522 may extend from the base portion 526. In some embodiments, the terminal 52 comprises an extension portion 525 and a base portion 526. The extension portion 525 connects the tail 521 and the base portion 526, and the elastic arm 522 may extend from the base portion 526. In some embodiments, at least a part of the extension portion 525 may be embedded in the insulative housing 51. In some embodiments, at least a part of the base portion 526 may be embedded in the insulative housing 51.

Figure 4:
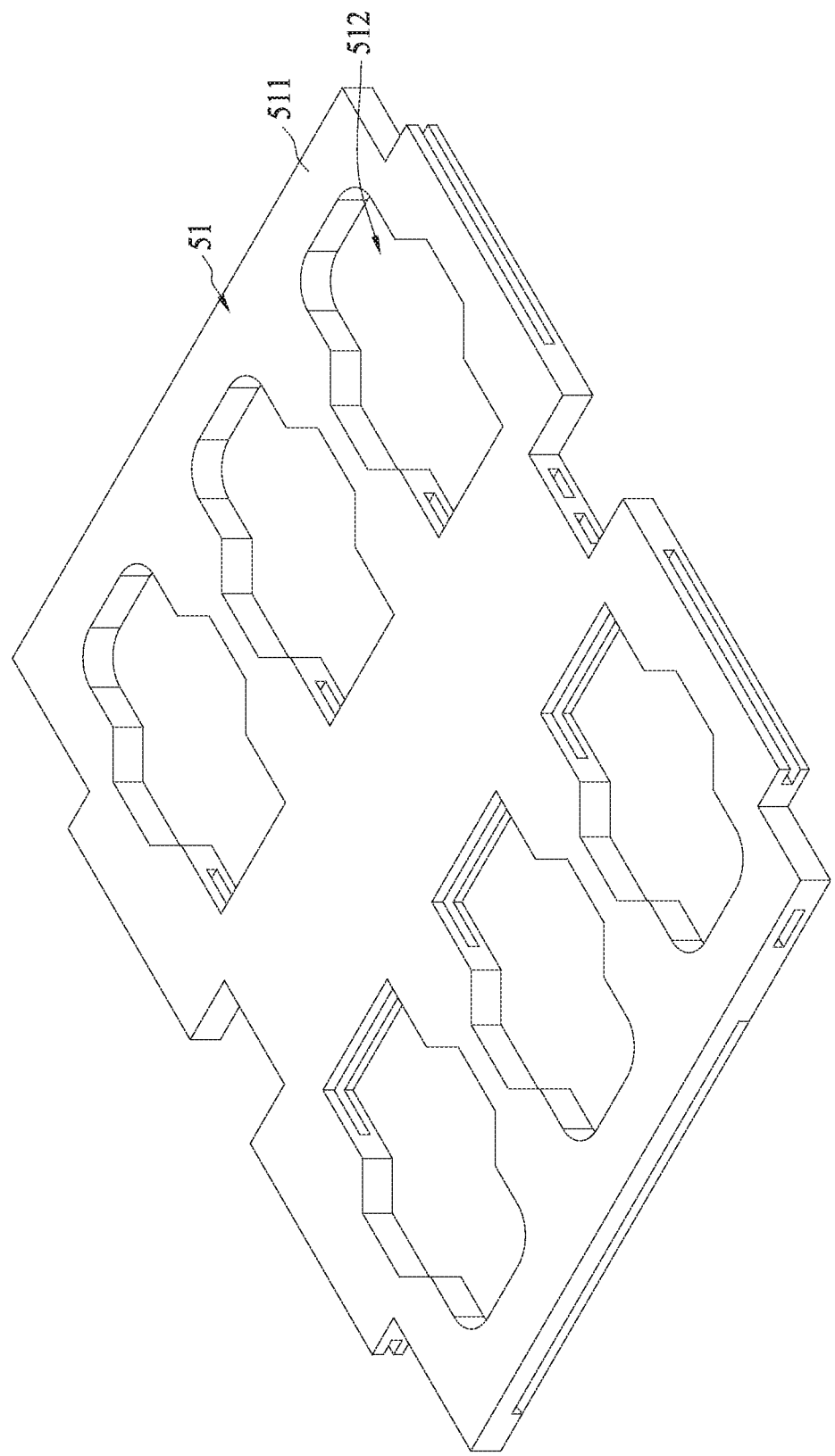
FIG. 4 is a schematic view of an embodiment of the present disclosure illustrating an insulative housing.
Figure 8:
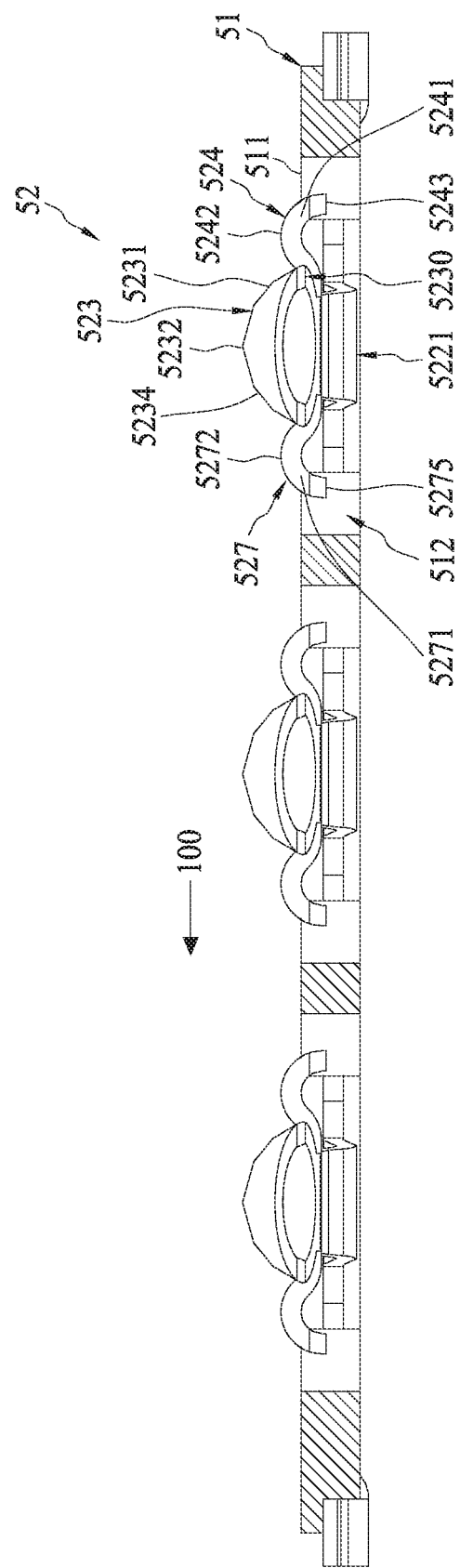
FIG. 8 is a schematic view of the embodiment of the present disclosure illustrating the terminals and the insulative housing.

Referring to FIG. 4 and FIG. 8, the insulative housing 51 may have a plurality of terminal grooves 512. The plurality of terminals 52 are correspondingly provided to the plurality of terminal grooves 512. The contact 523 may be positioned at a distal end of the elastic arm 522. The elastic arm 522 may make at least a part of the contact 523 protrude relative to an upper surface 511 of the insulative housing 51. In some embodiments, the elastic arm 522 extends in the corresponding terminal groove 512. In some embodiments, a part of the elastic arm 522 may extend out of the terminal groove 512. In some embodiments, the elastic arm 522 first extends obliquely and downwards from an end close to a side wall of the terminal groove 512 and then extends obliquely and upwards, so that the elastic arm 522 has a downward recessed segment 5221, consequently a height of the contact 523 is not increased or decreased in a case that a length of the elastic arm 522 is maintained as a constant predetermined value, or the length of the elastic arm 522 is increased under a predetermined horizontal distance.

Figure 5:
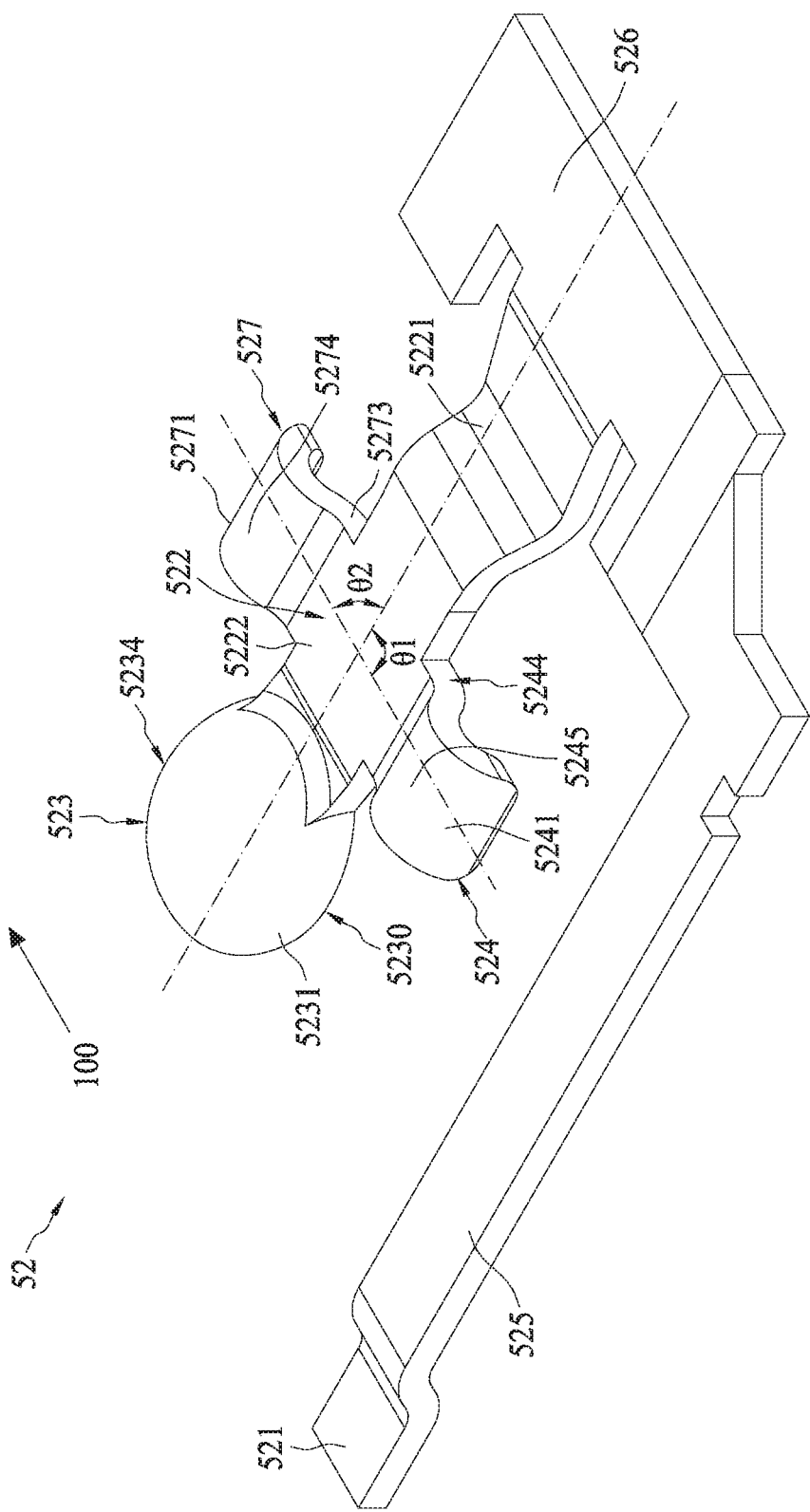
FIG. 5 is a schematic view of an embodiment of the present disclosure illustrating the terminal.

Referring to FIG. 5 and FIG. 8, in some embodiments, the contact 523 may be an arch top cover. In some embodiments, the contact 523 may be a dome shape. In some embodiments, the contact 523 may be an arc piece.

Figure 2:
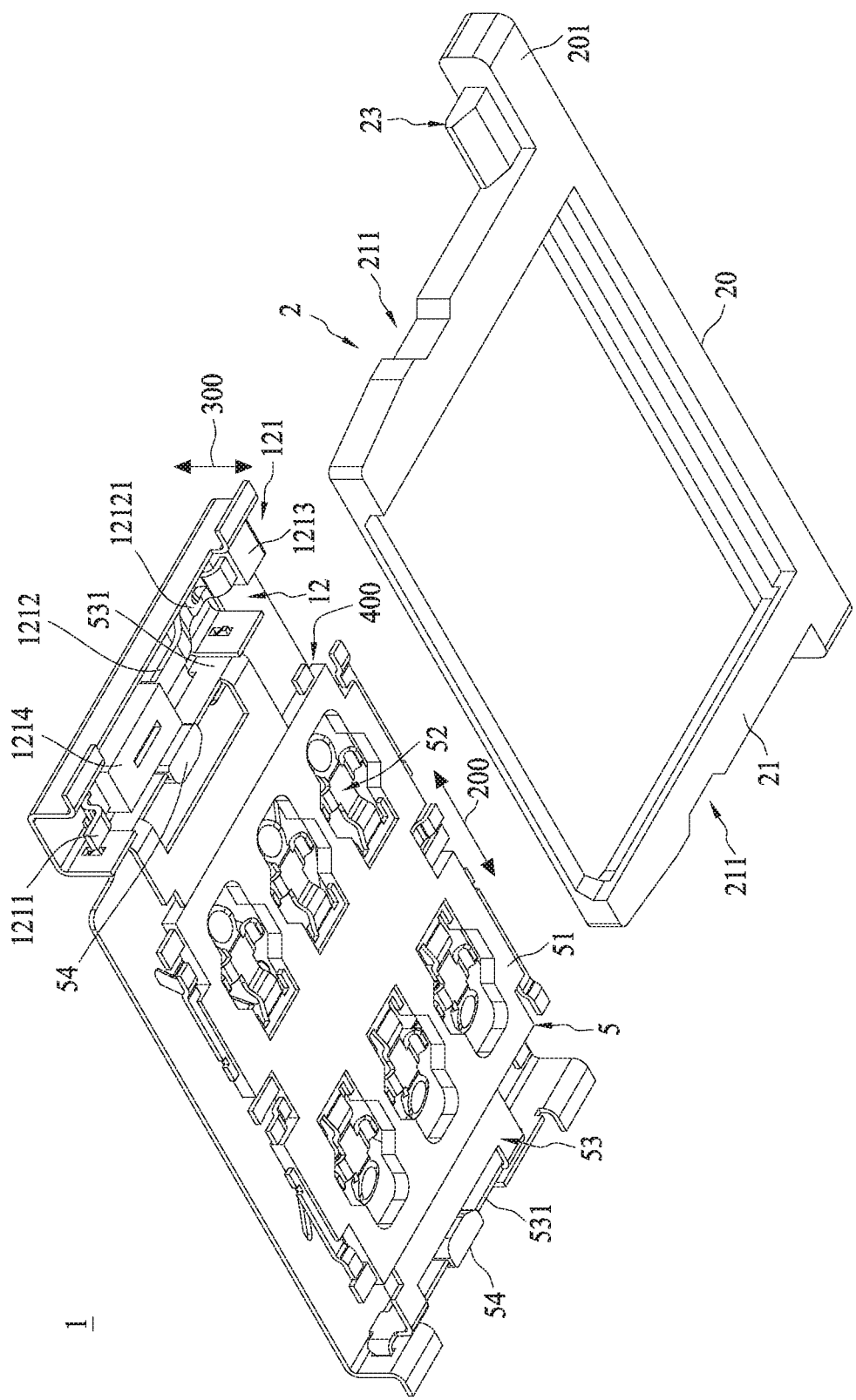
FIG. 2 is a schematic view of an embodiment of the present disclosure illustrating the electrical connector and the tray.

Referring to FIGS. 2, 5 and 8, in some embodiments, the contact 523 comprises a front guiding surface 5231. When the electronic card 3 is inserted, the electronic card 3 contacts the front guiding surface 5231 and moves along the front guiding surface 5231, so as to push the contact 523 to move downwards toward the terminal groove 512. The front guiding surface 5231 may extend forwards and downwards. In some embodiments, when the contact 523 is a shape of the arch top cover or the dome shape, an outer surface of the contact 523 is composed of a front side surface and a rear side surface, the front guiding surface 5231 is a part of or the whole of the front side surface. In some embodiments, the front guiding surface 5231 along the left-right direction 200 is slightly larger than a range that the electronic card 3 contacts the front guiding surface 5231 when the electronic card 3 is inserted. In some embodiments, the front guiding surface 5231 extends downwards to a bottom edge 5230 of the contact 523.

Figure 3:
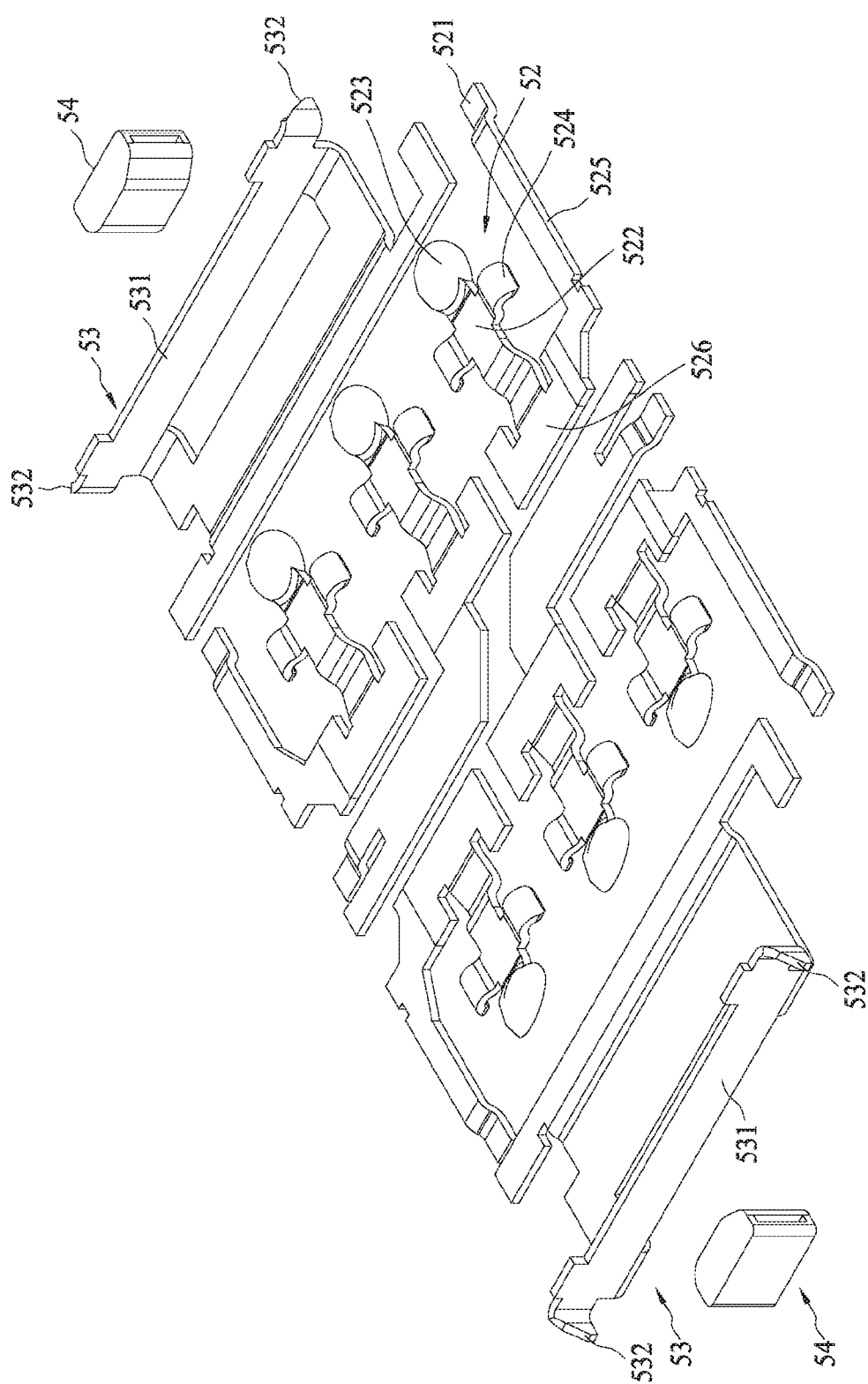

Referring to FIG. 3, FIG. 5 and FIG. 8, in some embodiments, the front guiding member 524 extends forwards from the elastic arm 522. An extending direction of the elastic arm 522 and an extending direction of the front guiding member 524 may be intersected as an angle θ1. In some embodiments, the angle θ1 may be 90°; but the present disclosure is not limited to this.

Referring to FIG. 5 and FIG. 8, the front guiding member 524 may comprise a front guiding portion 5241. The front guiding portion 5241 may extend forwards and downwards. The front guiding portion 5241 is positioned in front of the front guiding surface 5231 of the contact 523, therefore the front guiding portion 5241 may early contact the inserted electronic card 3. In some embodiments, at least a part of the front guiding portion 5241 may protrude relative to the upper surface 511 of the insulative housing 51.

Figure 7:
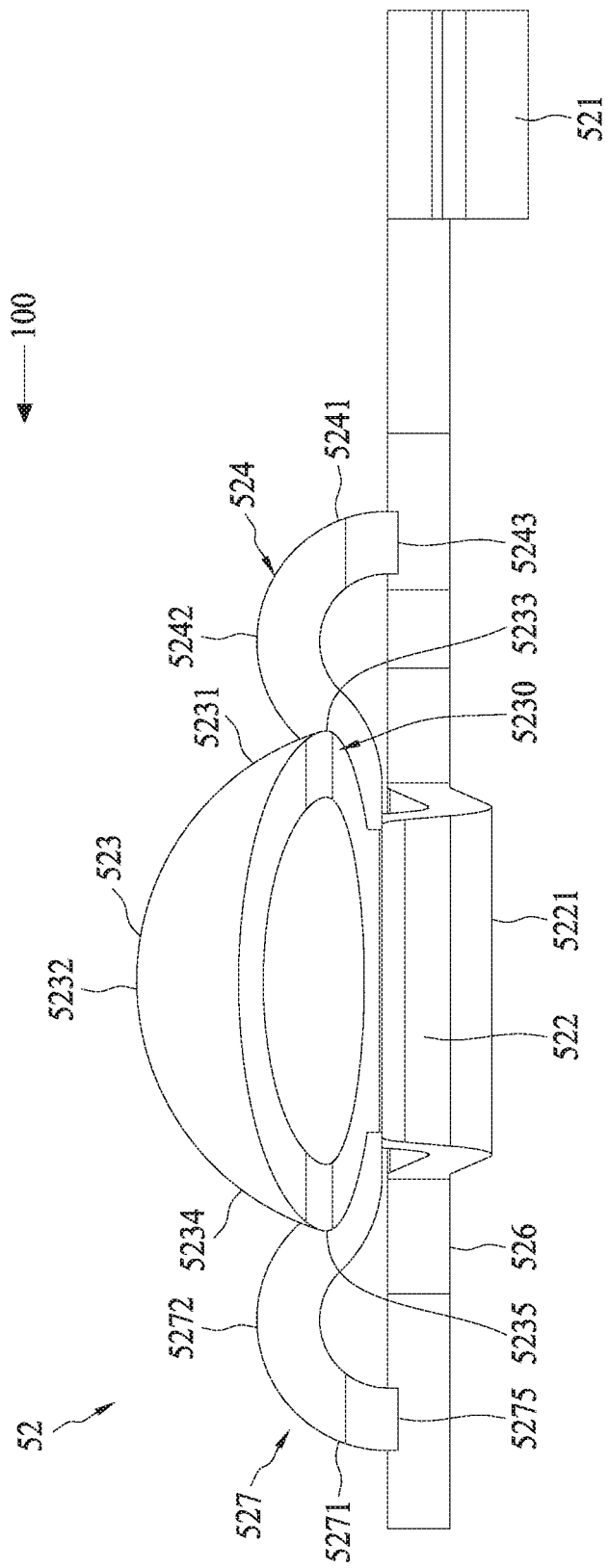
FIG. 7 is still another schematic view of the embodiment of the present disclosure illustrating the terminal.

Referring to FIG. 7, in some embodiments, the contact 523 has a highest position 5232, the front guiding member 524 has a highest position 5242, the highest position 5242 of the front guiding member 524 is lower than the highest position 5232 of the contact 523. In some embodiments, a lowest position 5233 of the front guiding surface 5231 of the contact 523 is lower than the highest position 5242 of the front guiding member 524, which can avoid the electronic card 3 contacting the bottom edge 5230 of the contact 523 when the electronic card 3 is inserted and in turn avoid the terminal 52 being deformed. In some embodiments, the lowest position 5233 of the front guiding surface 5231 is a lowest position on a lower edge of the front guiding surface 5231, a highest position on the lower edge of the front guiding surface 5231 or any position between the lowest position on the lower edge of the front guiding surface 5231 and the highest position on the lower edge of the front guiding surface 5231.

Referring to FIG. 8, in some embodiments, the front guiding member 524 has a lowest position 5243. When the terminal 52 is not actuated, the lowest position 5243 may be lower than the upper surface 511 of the insulative housing 51. In some embodiments, the front guiding member 524 has a distal end edge, and the lowest position 5243 is any position on the distal end edge. In some embodiments, the any position may be a lowest position, a highest position, or any position between the lowest position and the highest position on the distal end edge.

Referring to FIG. 5, in some embodiments, the elastic arm 522 comprises a horizontal extending segment 5222, and the front guiding member 524 extends from the horizontal extending segment 5222.

In some embodiments, the front guiding member 524 comprises a connecting portion 5244 and a protruding portion 5245. The connecting portion 5244 extends forwards from the elastic arm 522. The connecting portion 5244 may be connected to the protruding portion 5245. The protruding portion 5245 protrudes upwards. The protruding portion 5245 may be connected to the front guiding portion 5241.

Figure 6:
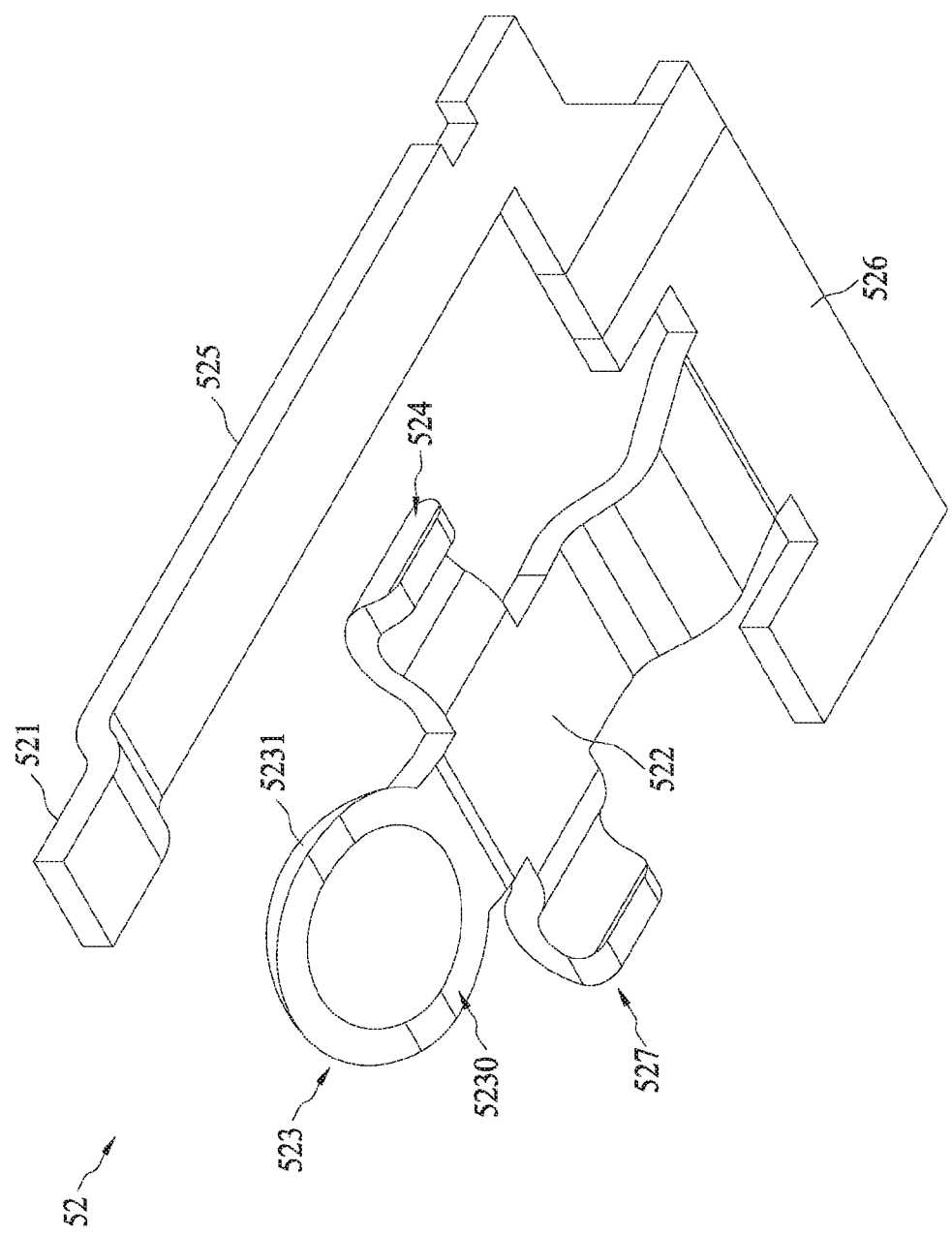
FIG. 6 is another schematic view of the embodiment of the present disclosure illustrating the terminal.

Referring to FIG. 5 to FIG. 7, the terminal 52 comprises a rear guiding member 527. The rear guiding member 527 may prevent the empty tray 2 from hooking the terminal 52 when the empty tray 2, which does not carry the electronic card, is removed from the electrical connector 1. The rear guiding member 527 may comprise a rear guiding portion 5271, the rear guiding portion 5271 may extend rearwards and downwards. Furthermore, the contact 523 has a rear guiding surface 5234. The rear guiding surface 5234 may extend rearwards and downwards. The rear guiding portion 5271 is positioned behind the rear guiding surface 5234. The rear guiding member 527 has a highest position 5272, the highest position 5272 of the rear guiding member 527 is lower than the highest position 5232 of the contact 523. The rear guiding surface 5234 may have a lowest position 5235, the lowest position 5235 of the rear guiding surface 5234 is lower than the highest position 5272 of the rear guiding member 527. In some embodiments, the lowest position 5235 of the rear guiding surface 5234 may be a lowest position on a lower edge of the rear guiding surface 5234, a highest position on the lower edge of the rear guiding surface 5234, or any position between the lowest position on the lower edge of the rear guiding surface 5234 and the highest position on the lower edge of the rear guiding surface 5234.

Referring to FIG. 8, in some embodiments, the rear guiding member 527 has a lowest position 5275. When the terminal 52 is not actuated, the lowest position 5275 may be lower than the upper surface 511 of the insulative housing 51. In some embodiments, the rear guiding member 527 has a distal end edge, the lowest position 5275 is any position on the distal end edge. In some embodiments, the any position may be a lowest position, a highest position, or any position between the lowest position and the highest position on the distal end edge.

In some embodiments, the contact 523 is an arch top cover or a dome shape, an outer surface of the contact 523 is composed of a front side surface and a rear side surface, and the rear guiding surface 5234 is a part of or the whole of the rear side surface. In some embodiments, the rear guiding surface 5234 extends downwards to the bottom edge 5230 of the contact 523.

Referring to FIG. 5, in some embodiments, the rear guiding member 527 extends rearwards from the elastic arm 522. The extending direction of the elastic arm 522 and an extending direction of the rear guiding member 527 may be intersected as an angle θ2. In some embodiments, the angle θ2 may be 90° but other angles are contemplated.

In some embodiments, the front guiding member 524 and the rear guiding member 527 may be same while in other embodiments they can be different.

In some embodiments, the front guiding member 524 and the rear guiding member 527 may be aligned with each other along a direction formed by two sides of the elastic arm 522 of the terminal 52 but such alignment is not required. In some embodiments, the front guiding member 524 and the rear guiding member 527 may be aligned with each other along the card insertion direction 100 but alignment is not required.

Referring to FIG. 5, in some embodiments, the elastic arm 522 comprises a horizontal extending segment 5222, the rear guiding member 527 extends from the horizontal extending segment 5222.

Referring to FIG. 7, in some embodiments, the rear guiding member 527 comprises a connecting portion 5273 and a protruding portion 5274. The connecting portion 5273 extends rearwards from the elastic arm 522. The connecting portion 5273 is connected to the protruding portion 5274. The protruding portion 5274 is connected to the rear guiding portion 5271.

Figure 9:
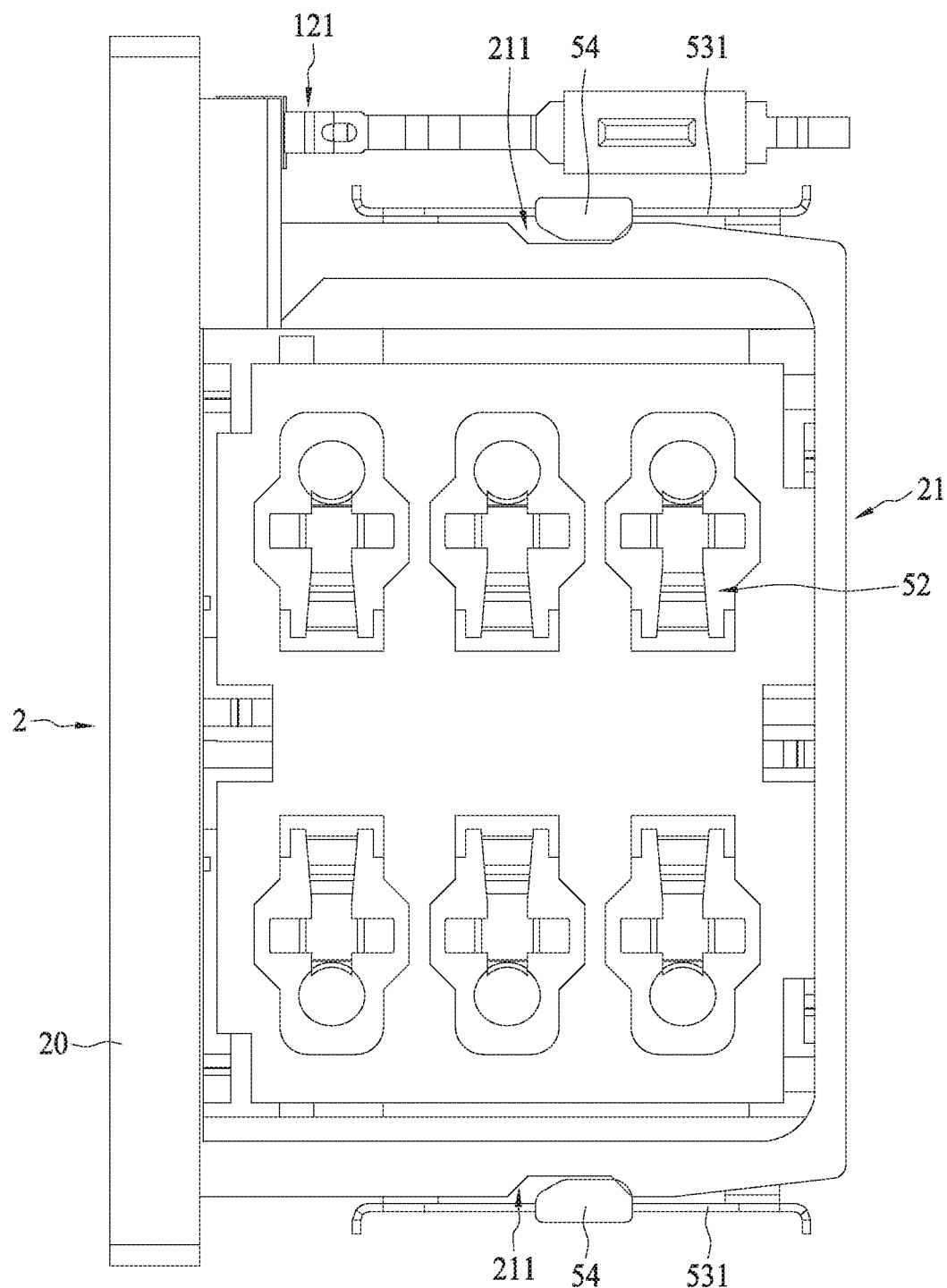
FIG. 9 is a schematic view of an embodiment of the present disclosure illustrating a terminal module, the tray and a detecting terminal inserted in the terminal module.

Referring to FIG. 3 and FIG. 4, the terminal module 5 comprises two metal frames 53 and two latch blocks 54. The each metal frame 53 comprises an elastic beam 531, the two elastic beams 531 are positioned at two opposite sides of the terminal module 5, and the each latch block 54 are provided on the corresponding elastic beam 531. In some embodiments, the each latch block 54 is provided on the corresponding elastic beam 531 by overmolding. Referring to FIG. 1 and FIG. 9, the tray 2 comprises a front frame bar 20 and a frame portion 21. The frame portion 21 is connected to the front frame bar 20. The frame portion 21 defines a space for receiving the electronic card 3. The frame portion 21 may have two latch recesses 211. After the tray 2 is inserted in the electrical connector 1, the two latch blocks 54 respectively latch on to the latch recesses 211 so as to hold the tray 2.

Referring to FIG. 1, the tray 2 can be formed of a metal or non-metal material. In some embodiments, the tray 2 may be metal and may include an insulative material layer 22, the insulative material layer 22 is formed on an inner edge portion of the tray 2 which supports and contacts the electronic card 3, the insulative material layer 22 may electrically isolate the tray 2 and the electronic card 3 to prevent a short circuit between the tray 2 and the electronic card 3.

Figure 10:
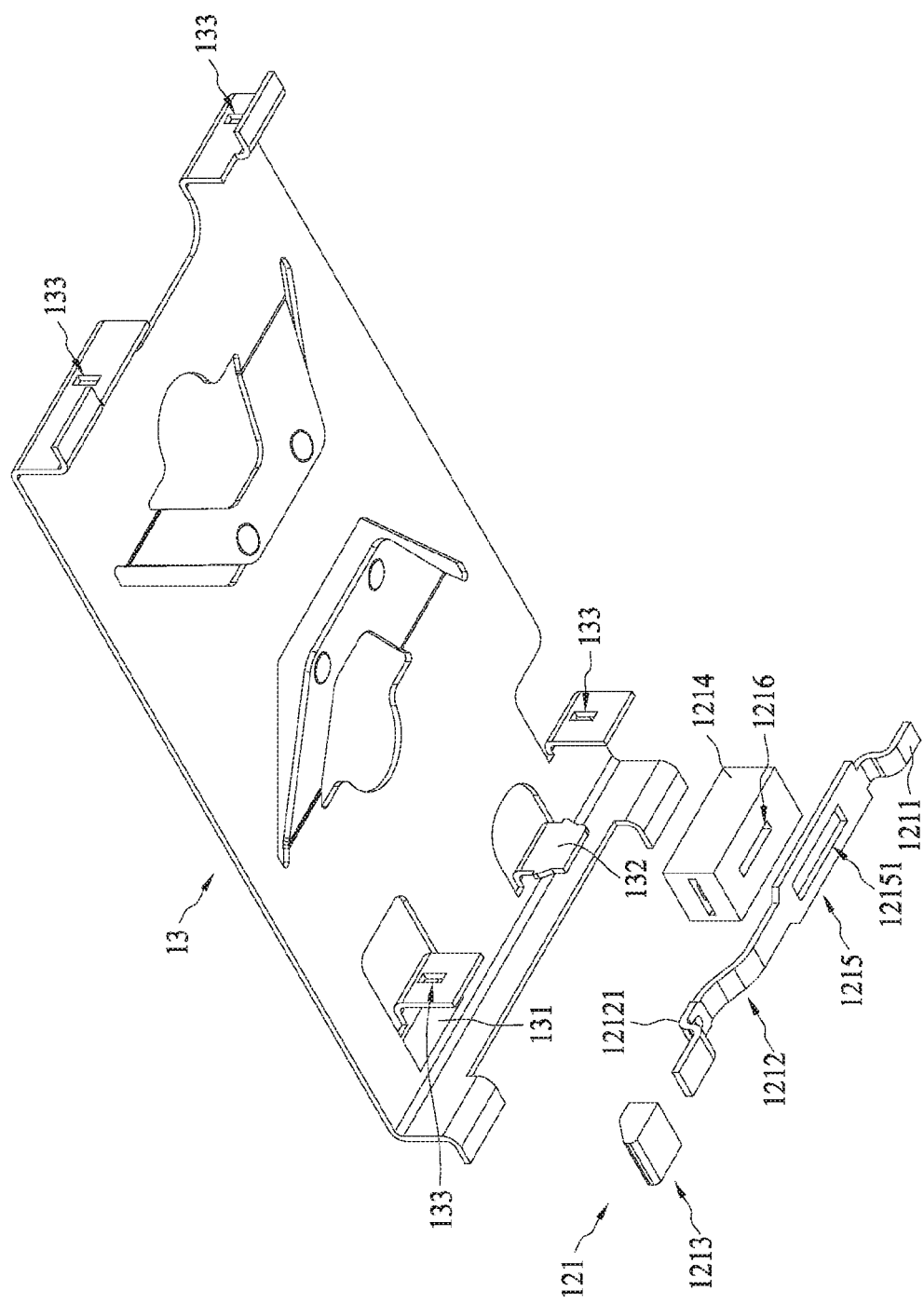
FIG. 10 is a schematic view of the embodiment of the present disclosure illustrating an metal upper cover and the detecting terminal.

Referring to FIG. 1, FIG. 2 and FIG. 10, in some embodiments, the electrical connector 1 comprises a detecting switch 12. The detecting switch 12 is used to detect whether the tray 2 is inserted. The detecting switch 12 comprises a detecting terminal 121 and a conductive member which cooperates with the detecting terminal 121. The detecting terminal 121 comprises a tail 1211, an elastic arm 1212 and an insulative pushed block 1213. The tail 1211 may be soldered on the circuit board 4, or the tail 1211 may be connected to a conductive path on the circuit board 4 with other configuration. The elastic arm 1212 comprises a contact 12121. The insulative pushed block 1213 is provided to a distal end of the elastic arm 1212. When the insulative pushed block 1213 is pushed, the contact 12121 maybe out of contact with the conductive member or contact the conductive member, thereby making the detective status of the detecting switch 12 changed. In some embodiments, the elastic arm 1212 may be elastically displaced along an up-down direction 300 (e.g., upwards or downwards) or in a thickness direction of the electrical connector 1; but the present disclosure is not limited to this. In some embodiments, the insulative pushed block 1213 is pushed upwards or downwards so as to make the contact 12121 out of contact with the conductive member. In some embodiments, the insulative pushed block 1213 is pushed upwards or downwards so as to make the contact 12121 contact the conductive member. In some embodiments, the detecting terminal 121 is elastically displaced along the left-right direction to contact the conductive member or be out of contact with the conductive member.

In some embodiments, the detecting switch 12 is a normally open switch. In other embodiments, the detecting switch 12 is a normally close switch.

Figure 11:
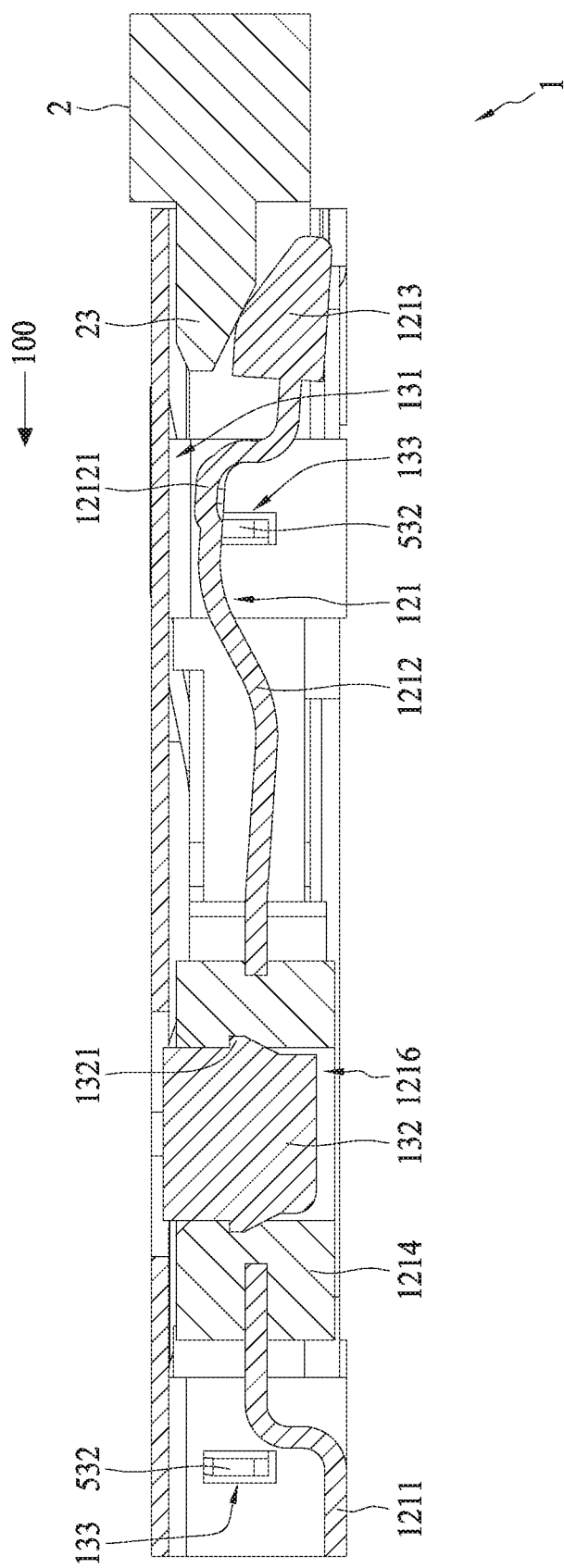
FIG. 11 is a schematic view of an embodiment of the present disclosure illustrating how the detecting status of the detecting terminal is changed by the tray.

Referring to FIG. 10 and FIG. 11, in some embodiments, the electrical connector 1 comprises a metal upper cover 13, a bottom region 131 of the metal upper cover 13 acts as the conductive member and is a part of the metal upper cover 13. In some embodiments, the conductive member is a member separated from the metal upper cover 13. In some embodiments, the conductive member is provided on the terminal module 5.

In some embodiments, the detecting terminal 121 comprises an insulative fixed block 1214, the detecting terminal 121 is fixed at any proper position of the electrical connector 1 via the insulative fixed block 1214. In some embodiments, the detecting terminal 121 comprises a fixed portion 1215. The insulative fixed block 1214 is provided on the fixed portion 1215. In some embodiments, at least a part of the fixed portion 1215 is embedded in the insulative fixed block 1214, but the present disclosure is not limited to this. The insulative fixed block 1214 has an insertion hole 1216, and the electrical connector 1 comprises an inserting piece 132. The inserting piece 132 is inserted in the insertion hole 1216 so as to make the detecting terminal 121 fixed. In some embodiments, the metal upper cover 13 comprises an inserting piece 132, but the present disclosure is not limited to this. Referring to FIG. 11, in some embodiments, the inserting piece 132 comprises at least an interference block 1321. The interference block 1321 and the insertion hole 1216 of the insulative fixed block 1214 are engaged as an interference fit. When the inserting piece 132 is inserted in the insertion hole 1216 of the insulative fixed block 1214, the interference block 1321 may be anchored in the insertion hole 1216 of the insulative fixed block 1214 so as to make the detecting terminal 121 fixed. Referring to FIG. 10, in some embodiments, the fixed portion 1215 of the detecting terminal 121 has an aperture 12151. The aperture 12151 corresponds to the insertion hole 1216 of the insulative fixed block 1214. The aperture 12151 may allow the inserting piece 132 to pass through. In some embodiments, the fixed portion 1215 of the detecting terminal 121 may not have an aperture, but extend in manner of keeping away from the inserting piece 132.

Referring to FIGS. 1, 2 and 11, the tray 2 comprises a pushing block 23. When the tray 2 is inserted into the electrical connector 1, the pushing block 23 pushes the insulative pushed block 1213 of the detecting terminal 121 to make the contact 12121 of the detecting terminal 121 be out of contact with the conductive member or contact the conductive member. In some embodiments, the detecting terminal 121 is positioned outside the insertion space 11 and extends forwards, but does not extend into the insertion space 11. The front frame bar 20 of the tray 2 comprises a side extending portion 201, the side extending portion 201 extends in front of the detecting terminal 121, and the pushing block 23 is provided on the side extending portion 201.

Referring to FIGS. 3, 10 and 11, the metal frame 53 comprises a latch hook 532, the metal upper cover 13 is correspondingly provided with a latch hole 133, the latch hook 532 and the latch hole 133 are engaged as a clearance fit. That the latch hook 532 latches on to the latch hole 133 may make the metal upper cover 13 fixed on the terminal module 5, which provides movable margin for each of the metal upper cover 13 and the terminal module 5 to increase the coplanarity of the surface soldering before the metal upper cover 13 and the terminal module 5 are soldered on the circuit board 4.

In at least one embodiment, the terminal of the electrical connector comprises a front guiding member. The front guiding member may be contacted and pressed downwards first to make the contact of the terminal together move downwards by a certain distance when the electronic card is inserted, then the electronic card contacts and downwards presses the contact; that is the contact of the terminal may be pressed downwards in two stages, which may significantly decrease the impact force and the lateral shearing force exerted on the terminal, and definitely maintain the normal function of the terminal. In some embodiments, the terminal may comprise a rear guiding member. The rear guiding member may make the contact pressed downwards in two stages so as to prevent the tray hooking the terminal when an empty tray is removed.

Technical contents and technical features of the present disclosure are disclosed as above, but person skilled in the art still may make various substitutions and modifications without departing from the spirit of the present disclosure based on the teaching and disclosure of the present disclosure. Therefore, the protection scope of the present disclosure should not be limited to the contents disclosed by the embodiments, but should include various substitutions and modifications without departing the present disclosure, and is covered by the appended Claims of the present disclosure.

What is claimed is:

1. A terminal, comprising:
    a tail;
    an elastic arm connected to the tail;
    a contact positioned at a distal end of the elastic arm, the contact comprising a front guiding surface extending forwards and downwards; and
    a front guiding member extending forwards from the elastic arm, the front guiding member having a front guiding portion extending forwards and downwards, wherein the elastic arm extends in a first direction and the front guiding member extends in a second direction, the first and second directions being at an angle to each other, the front guiding portion being positioned in front of the front guiding surface of the contact, wherein a highest position of the front guiding member is lower than a highest position of the contact and a lowest position of the front guiding surface of the contact is lower than the highest position of the front guiding member.

2. The terminal according to claim 1, wherein the terminal further comprises a rear guiding member extending rearwards from the elastic arm, the rear guiding member comprises a rear guiding portion extending rearwards and downwards, the contact comprises a rear guiding surface extending rearwards and downwards, the rear guiding portion being positioned behind the rear guiding surface, a highest position of the rear guiding member being lower than the highest position of the contact and a lowest position of the rear guiding surface being lower than the highest position of the rear guiding member.

3. The terminal according to claim 2, wherein the rear guiding member includes a connecting portion extending rearwards from the elastic arm and further includes a protruding portion protruding upwards and connected to the rear guiding portion.

4. The terminal according to claim 2, wherein the contact is an arch top cover, a front surface of the arch top cover forms the front guiding surface, and a rear surface of the arch top cover forms the rear guiding surface.

5. The terminal according to claim 2, wherein the extending direction of the elastic arm and an extending direction of the rear guiding member are intersected as an angle of 90°.

6. The terminal according to claim 1, wherein the extending direction of the elastic arm and the extending direction of the front guiding member are intersected as the angle of 90°.

7. The terminal according to claim 1, wherein the front guiding member comprises a connecting portion extending forwards from the elastic arm and a protruding portion protruding upwards and is connected to the front guiding portion.

8. An electrical connector, comprising:
an insulative housing comprising an upper surface;
a plurality of terminals fixed to the insulative housing, each of the plurality of terminals including a tail, an elastic arm connected to the tail, a front guiding surface extending forwards and downwards and a contact positioned at a distal end of the elastic arm, the contact protruding relative to the upper surface of the insulative housing; and
a front guiding member, extending forwards from the elastic arm, the front guiding member comprising a front guiding portion extending forwards and downwards, the front guiding portion protruding relative to the upper surface of the insulative housing, wherein the elastic arm extends in a first direction and the front guiding member extends in a second direction that intersects the first direction at an angle, the front guiding portion being positioned in front of the front guiding surface of the contact, a highest position of the front guiding member being lower than a highest position of the contact, a lowest position of the front guiding surface of the contact being lower than the highest position of the front guiding member, a lowest position of the front guiding member being lower than the upper surface of the insulative housing.

9. The electrical connector according to claim 8, wherein each of the plurality of terminals comprises a rear guiding member extending rearwards from the elastic arm in a third direction, the rear guiding member of each terminal including a rear guiding portion that extends rearwards and downwards, wherein the contact of each of the plurality of terminals includes a rear guiding surface that extends rearwards and downwards, and the rear guiding portion is positioned behind the rear guiding surface in each terminal, wherein a highest position of the rear guiding member is lower than the highest position of the contact in each terminal and a lowest position of the rear guiding surface is lower than the highest position of the rear guiding member in each terminal.

10. The electrical connector according to claim 9, wherein the rear guiding member of each of the plurality of terminals includes a connecting portion that extends rearwards from the elastic arm and a protruding portion that protrudes upwards and is connected to the rear guiding portion.

11. The electrical connector according to claim 9, wherein the contact of each of the plurality of terminals is an arch top cover and a front surface of the arch top cover forms the front guiding surface, and a rear surface of the arch top cover forms the rear guiding surface.

12. The electrical connector according to claim 9, wherein the first direction and the third direction are intersected at an angle of 90°.

13. The electrical connector according to claim 8, wherein the first direction and the second direction are intersected at an angle of 90°.

14. The electrical connector according to claim 8, wherein the front guiding member of each of the plurality of terminals includes a connecting portion that extends forward from the elastic arm and a protruding portion that protrudes upwards and is connected to the front guiding portion.

* * * * *